T. Ellis,
Casting Boxes for Wheel Hubs.
No. 950. Reissued May 1, 1860.
Fig; 1.
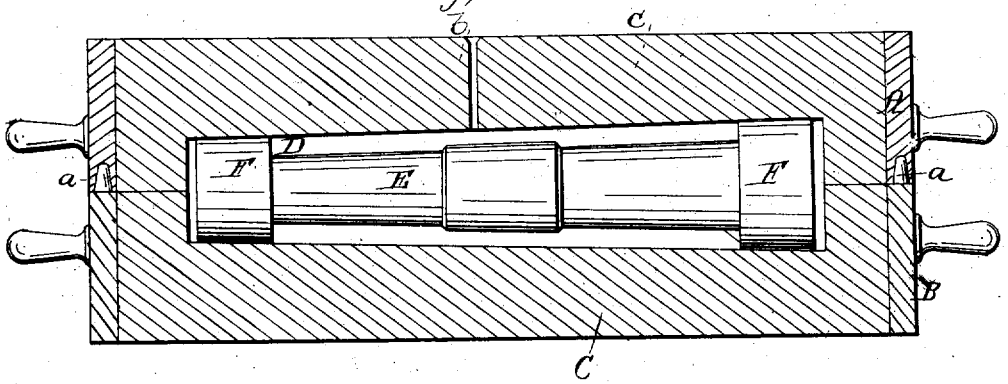
Fig; 2.
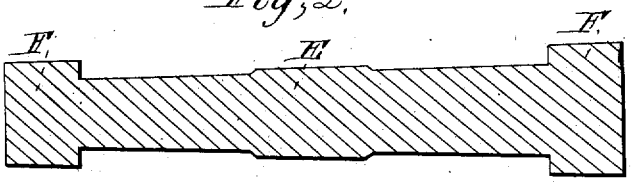
Fig; 3.
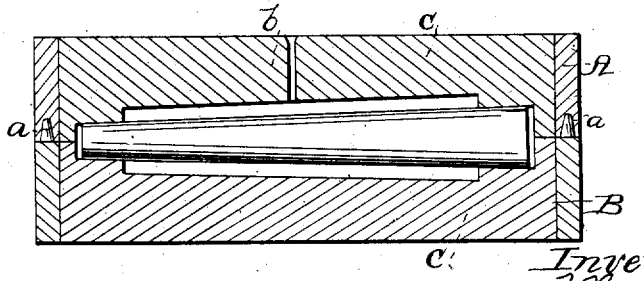
Witnesses;
A H Shoemaker
William Pickhard
Inventors;
Thomas Ellis
Wm A. Ellis
A D Ellis
N. PETERS, PHOTO-LITHOGRAPHER, WASHINGTON, D. C.

UNITED STATES PATENT OFFICE.

THOMAS ELLIS, WM. A. ELLIS, AND A. D. ELLIS, OF PHILADELPHIA, PENNSYLVANIA, ASSIGNEES OF THOMAS ELLIS.

IMPROVEMENT IN CASTING BOXES FOR WHEEL-HUBS.

Specification forming part of Letters Patent No. 26,394, dated December 6, 1859; Reissue No. 950, dated May 1, 1860.

*To all whom it may concern:*

Be it known that THOMAS ELLIS, of the city and county of Philadelphia, and State of Pennsylvania, has invented a new and useful Improvement in Casting Boxes for Wheel-Hubs; and we do hereby declare the following to be a full, clear, and exact description of the same, reference being had to the annexed drawings, making a part of this specification, in which—

Figure 1 is a side sectional view of a mold constructed so that the boxes may be cast in accordance with my invention. Fig. 2 is a detached view of the core of the same. Fig. 3 is a side sectional view of a mold formed in the usual way for casting boxes, and illustrated in order to show clearly the advantage of my invention.

Similar letters of reference indicate corresponding parts in the several figures.

The object of this invention is to cast the boxes with internal diameters of uniform size by obviating the difficulty hitherto attending the varying position of the core relatively with the other parts forming the mold, the change of position of the core within the mold at each casting very appreciably affecting the interior of the boxes, as is well known.

To enable others skilled in the art to fully understand and construct this invention, we will proceed to describe it.

A represents the upper, and B the lower, flask of a mold; C, the sand; and D the recess or chamber made therein, which gives the external form to the box, a longitudinal half of this chamber being made in the sand-flask by the usual pattern.

E is the core, which as usual corresponds to the desired form of the interior of the boxes to be cast. This core is of dried sand, and has a conical projection or head, F, at each end, and which about correspond in diameter to the diameter of the chamber D at the points where said heads are placed. (See Fig. 1.) The core may be formed by means of a proper mold, and the space between the projections or heads determines the length of the box. When the core E is fitted in the chamber D, and the two flasks A B placed together and secured, as usual, by dowels *a*, the mold is formed, a vent, *b*, being formed in the upper flask, A′, to allow the molten metal to be poured into the mold. The casting, it will be seen, is formed around the core E and between the projections or heads F. The position, therefore, of the casting around the core is arbitrary in all cases, every casting corresponding in this respect, and therefore the internal diameter of the castings will be uniform, even if the position of the core varies in the chamber D. The latter contingency, it will be seen, would only affect the external diameter of the box. It is necessary that the core E (excluding, of course, the projections or heads F) be shorter than the chamber D. This is necessary in order that the upper flask may be fitted down on the lower one without having the ends of the core abraded or mar the ends of the chamber D, which would be the case were the ends of the core (the projections or heads F) fitted snugly against the ends of the chamber. By allowing a space, therefore, between the ends of the core and the ends of the chamber D, as shown in Fig. 1, the upper flask may be fitted on the lower one without the liability of injuring the mold. This shortness of the core of course involves a varying position of the same within the mold. As it cannot always be placed in the same spot, there will be some variation; but in this invention it can only affect the external diameter of the box, not the internal diameter, for the reason previously stated. The core, it will be seen, if placed in the mold so that a greater space is allowed at the smaller end of the chamber D than at the larger end, will form a mold that will cause the internal diameter of the box to be smaller than if the core were placed in a reverse position—that is to say, with a greater space at the larger end of the chamber D. The variation in the diameter of the box externally is a matter of not much moment; but the variation of the internal diameter is attended with considerable embarassment and expenses, as the boxes when so all require to be reamed out in order to fit the arm or shaft of the axle. When too large, there is no remedy, and the box when rotating rattles on the arm, causing unnecessary wear in consequence of the play which is allowed it.

In the old method of casting boxes the core

E′ is made longer than the chamber D, (see Fig. 3,) and "prints" *c* are made in the same at the ends of the chamber in order to receive the ends of the core. These prints are made sufficiently long to allow a space at each end of the core, for the same reason as expressed when describing the core E—viz., to preserve the abrasion of the portion of the mold in the upper flask when the latter is adjusted on the lower flask. Now, it will be seen by referring to Fig. 3 that as the core cannot always be adjusted in the same precise spot in the chamber D, the boxes will be cast with varying internal diameters corresponding with the varying position of the core within the chamber. It will also be seen that beside this difficulty, that if the flasks do not coincide precisely in the direction of their length that the ends of the boxes will be cast irregularly and require to be ground off evenly, thereby materially shortening the boxes.

Sand heads have hitherto been used for the purpose of producing a depression on the interior of the box corresponding to them. They have not, however, been placed on the ends of the core, so as to terminate the box. As hitherto used they have been accompanied by the prints and are liable to the objections above mentioned. The chamber D, as used with them, has had recesses in which they fit.

Having thus described the improvement, what we claim as the invention of the said THOMAS ELLIS is—

Supporting the sand core E between two sand heads, F, or their equivalents when used in combination with a chamber, D, of uniform taper, in the manner and for the purpose substantially as herein set forth.

THOS. ELLIS.
WM. A. ELLIS.
A. D. ELLIS

Witnesses:
A. H. SHOEMAKER,
WILLIAM PRITCHARD.